(12) United States Patent
Frishman et al.

(10) Patent No.: US 11,622,537 B2
(45) Date of Patent: Apr. 11, 2023

(54) PROTECTION APPARATUS AND METHOD

(71) Applicant: PIVOT EQUINE, LLC, Laguna Niguel, CA (US)

(72) Inventors: Kristi A. Frishman, Laguna Nigel, CA (US); Christopher R. Tilton, Dana Point, CA (US); Lindsay J. Hulley, Laguna Hills, CA (US)

(73) Assignee: Pivot Equine, LLC, Laguna Nigel, CA (US)

( * ) Notice: Subject to any disclaimer, the term of this patent is extended or adjusted under 35 U.S.C. 154(b) by 98 days.

(21) Appl. No.: 15/734,967

(22) PCT Filed: Jun. 3, 2019

(86) PCT No.: PCT/US2019/035270
§ 371 (c)(1),
(2) Date: Dec. 3, 2020

(87) PCT Pub. No.: WO2019/236504
PCT Pub. Date: Dec. 12, 2019

(65) Prior Publication Data
US 2021/0267167 A1 Sep. 2, 2021

Related U.S. Application Data

(60) Provisional application No. 62/680,316, filed on Jun. 4, 2018.

(51) Int. Cl.
*A01K 13/00* (2006.01)
*B32B 27/08* (2006.01)
(Continued)

(52) U.S. Cl.
CPC .......... *A01K 13/007* (2013.01); *A01K 13/008* (2013.01); *B32B 27/08* (2013.01);
(Continued)

(58) Field of Classification Search
CPC .... A01K 13/007; B32B 27/08; B32B 27/304; B32B 27/306; B32B 27/32; B32B 27/34;
(Continued)

(56) References Cited

U.S. PATENT DOCUMENTS 5,910,126 A 6/1999 Wilson et al.
8,465,444 B1 6/2013 Kopacki et al.
(Continued)

FOREIGN PATENT DOCUMENTS

WO 2019236504 A1 12/2019

OTHER PUBLICATIONS

PCT/US2019/035270 filed Jun. 3, 2019 International Search Report and Written Opinion dated Aug. 8, 2019.

*Primary Examiner* — Michael C Miggins
(74) *Attorney, Agent, or Firm* — Rutan & Tucker LLP (57) ABSTRACT

Exemplary embodiments herein describe accessory equipment for equestrian applications, and in particular a flexible protective wrap or boot for supporting and protecting the upper and lower leg of a horse, including the fetlock joint. When wrapped or fastened to a horse limb, the exemplary wrap can impact strength, friction surfaces, elongation, porosity, compression, breathability, water and moisture evaporation, elasticity, absorbency and cushioning. The wrapping structure may include improved limb support, general limb protection, and treatment for swollen legs, fetlock and pastern. Embodiments described herein may include limb protection in general and particularly during trailering and long transit in motor vehicles and trailers, cellulitis treatment, and providing compression that does not disrupt lymphatic flow and blood circulation when wrapping is applied.

20 Claims, 4 Drawing Sheets

(51) Int. Cl.
   *B32B 27/30* (2006.01)
   *B32B 27/32* (2006.01)
   *B32B 27/34* (2006.01)
   *B32B 27/36* (2006.01)
   *B68C 5/00* (2006.01)

(52) U.S. Cl.
   CPC .......... *B32B 27/304* (2013.01); *B32B 27/306* (2013.01); *B32B 27/32* (2013.01); *B32B 27/34* (2013.01); *B32B 27/365* (2013.01); *B68C 5/00* (2013.01); *B32B 2250/05* (2013.01); *B32B 2250/24* (2013.01); *B32B 2270/00* (2013.01); *B32B 2307/54* (2013.01); *B32B 2307/558* (2013.01); *B32B 2307/726* (2013.01); *B68C 2005/005* (2013.01)

(58) Field of Classification Search
   CPC .............. B32B 27/365; B32B 2250/05; B32B 2250/24; B32B 2270/00; B32B 2307/54; B32B 2307/558; B32B 2307/726; B68C 2005/005; B68C 5/00
   See application file for complete search history.

(56) References Cited

U.S. PATENT DOCUMENTS

| | | | |
|---|---|---|---|
| 2003/0124277 A1* | 7/2003 | Agarwal | ................ F28D 20/02 428/35.2 |
| 2004/0097860 A1 | 5/2004 | Tauber | |
| 2006/0198996 A1 | 9/2006 | Morton | |
| 2016/0262942 A1 | 9/2016 | Riesinger | |
| 2019/0307604 A1* | 10/2019 | Ainslie | .................... C25B 1/22 |

* cited by examiner

PROTECTION APPARATUS AND METHOD

PRIORITY

This application is a U.S. national stage application of International Application No. PCT/US2019/035270, which claims the benefit of priority to U.S. Provisional Application No. 62/680,316, filed Jun. 4, 2018, each of which is incorporated by reference in its entirety into this application.

FIELD OF THE INVENTION

The embodiments disclosed herein are generally directed to systems and methods for protecting a skin surface of an animal, in particular limbs and back portions, including in some embodiments improved materials and application methods. In an exemplary embodiment, a wrap is described for a leg of a horse, including cushioning material that provides improved comfort and protection for the horse. Embodiments also disclosed herein, the described improved wraps and materials for various other applications, including, saddle pads, boots and the like.

BACKGROUND

Many circumstances can exist under which the need to wrap a horse's lower leg between the hoof and the knee may arise. For example, a wrap may be used for limb protection during transport when a horse is forced to stand in a motor vehicle or trailer for an extended period of time. The wrap can also be used after periods of strenuous exercise, or during the "sweat" process, commonly used to reduce injury due to inflammation and swelling. However, there remain many performance and construction shortfalls with products currently available. Further, existing wrapping and cushioning materials fail to meet the requirements for performance and convenience.

When exercising a horse, the tempo of exercise can determine stress levels imposed on the tissues. Stress overload can be represented as a single event, where the magnitude of stress on the limb exceeds the ultimate strength of the wrap material under load, causing an acute injury. Such injuries include a pastern bone fracture or collateral ligament tear. Equally, if stress exceeds tolerable limits during repetitive loading, the materials used to wrap or support the body structure can cause micro-trauma of the tissues and eventually lead to changes in orthopedic health, described as chronic or overuse injuries. Overuse injuries tend to be degenerative in nature, therefore wraps having improper compression, ventilation, and even pressure can reinforce tissues deterioration. As the maximum exercise movement patterns are modified and more of the surrounding structures are subjected to overload and continued deterioration.

Typically, saddle pads, wraps, and similar items are made from single or multiple types of padding material. Exemplary materials include wool, polyester-wool mix or similar materials. However, these materials have limited capabilities in providing breathability, ventilation, cooling, thermal management, and the like. More importantly, these materials provide inconsistent compression and friction of the wrapped area.

The ability of a leg wrap to wick away moisture, and/or absorb moisture and thermal energy from the skin is important preventing injury, or for the treatment of injury. Also, the wrapping material composition, moisture uptake, water absorption, permeation rates, and breathability help prevent the spread of bacteria, fungus, and viruses, particularly in areas experiencing focal hyperhidrosis during exercise.

A leg wrap can further provide support and protection for equine limbs, particularly between the pastern and the knee and including the ligaments, tissues, tendons, the fetlock, fetlock joint and the splint bone. The fetlock joint, in particular, is susceptible to injury during hard running since stress on the joint structure tends to cause the joint to flex sufficiently to overstretch the joint tissues and such that the fetlock will impact the ground. The construction of some support wraps fails to provide adequate protection for the fetlock and the fetlock joint. For example, wraps which are provided with laterally extending straps or cradle slings for the fetlock are susceptible to being attached improperly when the wrap is applied to the leg, thus not adequately supporting the fetlock or the rectangular or trapezoidal shaped member with a laterally projecting arm and being further constructed to form the first and second pocket or cup portions leg tendons and tissues. Moreover, products such as the a fetlock cradle sling with straps do not adequately cover the fetlock and thus do not add protection to the fetlock to prevent injury from impact blows or contact with the ground, for example.

Wraps have also been susceptible to rapid wear and deterioration when applied to the rear legs, since the fetlock joints of the rear legs are likely to make hard, scuffing type contact with the ground. Another problem with support devices pertains to the difficulty with which the wrap or support is attached and properly positioned on the leg. If the wrap is not properly positioned and held in place on the leg via friction and with evenly applied leg compression, the support for the ligaments, tendons and bone structure can be inadequately or improperly secured, it can become loose during use and slide or fall off. If the wrap is applied too tightly it will be uncomfortable and may actually cause injury. Still further, a shock absorbing or impact absorbing attribute of the material should exist on the wrap to minimize injury caused by impact blows e.g. from the horse kicking itself, bumping into impediments, or being kicked by another horse in close proximity. Supporting the lower legs helps prevent injury in the vicinity of the splint bone or the lower leg area in general is particularly important. This type injury can also occur during turning movements when running and may result in bone injury in some instances.

Due to the retention of body heat by the horse, internal overheating can result in discomfort and possible injury. Injury risk can stem from existing products not allowing the perspiration of the horse to adequately vent and evaporate, or to be wicked away from the horse's body. Wraps including various quilted designs and wadding designs create unhygienic conditions by the combination of sweat, heat and the inability to wash or launder existing products when the wrap is in place for longer durations. Under these circumstances, it is helpful for the wrap to adequately wick and/or absorb moisture and fluids while maintaining secured in place and continue to provide both structural integrity and compression. Accordingly, further improvements in support wraps or boots for horses' legs have been sought to be adapted to support and protect the splint bone area of the horse's leg, in particular.

SUMMARY OF THE INVENTION

Briefly summarized, embodiments described herein are directed to improved materials for wraps, saddle pads and the like. These materials display improved moisture wicking and absorption properties, improved ventilation, improved thermal management, improved shock absorbing properties from physical trauma, and improved compression properties. Advantageously, these wraps and pads include materials that cost effective to produce and readily degradable so as to be easily disposable as well as non-toxic to the animal. As such, new, clean and dry wraps can be provided with each use, mitigating the potential for unhygienic conditions to develop.

Embodiments described herein reduce the level of surface hidrosis by up to 80% by weight within 5 minutes upon surface to surface contact at room temperatures, (i.e. between substantially 68° F. and 72° F.) and in conditions up to about 90% Relative Humidity (RH) while applied, for example, to a horse at rest. Embodiments described herein reduce skin wetness after exercise by up to 90%, as measured on a scale from 0 to 5. Where 0 is dry and 5 is dripping wet, the skin wetness measure by visual inspection. Embodiments described herein maintain skin temperatures, up to a maximum of 15 degrees C., during and after a standard exercise test, where a standard exercise test for a horse includes one or more of the following: 10 minutes of walk, 5 minutes of trot, 2.5 minutes of canter, 5 minutes of walk. Skin temperature was measured using a Testo 805i smart probe infrared thermometer with a wireless probe to measure the skin temperature. The thermometer having a measuring range of −30° C. to +250° C. and an accuracy of ±1.5° C. in the range of 0 to +250° C. The instrument resolution at 0.1° C. and the operating temperature −10° C. to +50° C. The temperature measured as close to the leg as possible, per manufacturer. The ambient surround temperatures during measurement from about −6° C. to 5° C.

An embodiment of the wrap which includes flexible support and extra layers of tensioning in the wrap material to better absorb shock in splint bone the vicinity may be useful. The thickness, density, and bulk of the wrap material should be sufficient for ease of use. Moreover, the wrap should act as a protective support pad. More specifically, various materials described herein, include waddings contained within the wrapping having water wicking properties and/or water absorbency of to up 40 times it weight and having up to 25 times its strength when wet. The wadding material can also serve as a tensioning material. When wrapped tightly, the resilience in the wadding material provides additional mechanical support. In some embodiments, fiber materials have thread count densities up to 1,000. In some embodiments, the single wrapping has widths to about 6 feet, lengths to about 10 feet, and thicknesses up to 10 inches. In some embodiments, materials have an elasticity up to 60% when wet and up to 40% when dry. In other embodiments, metals such as aluminum and other metals illustrated on the periodic chart or metallized synthetic or natural fiber layers in similar thicknesses and weights heretofore described can be incorporated into the wrapping structure providing thermal insulation and strength characteristics.

In some embodiments, the sweat control and absorbing process can include the application of many layers of various materials in multiple steps. In some embodiments, several preparations can be used including dimethylsulfoxide, nitrofurazone ointment, petroleum jelly, glycerin, glycerol, epsom salts, and mineral oil can be applied to a dry horse's leg. Subsequently, a layer of cotton batting, single cotton layer, or a cotton/poly filled pad is wrapped around the leg or also cotton substitutes. Cotton or cotton substitutes to include bamboo, ramie, viscose fiber, hemp, burlap, jute, duck cloth, denim, sisal, and linen having a tenacity of about 1.5 gm/den to about 9 gm/den., a elongation at break from 2% to 40%, elastic recovery rate at 2% with an ER from about 50% to 90% and at 5% extension and ER from about 25% to 60%, specific gravity from about 1.15 g/cm$^3$ to about 3.15 g/cm$^3$, a standard moisture gain from about 4.5 to 13.0 and in some cases a high resistance to organic solvents. The first layer comprising cotton or cotton substitute batting, or cotton or cotton substitute/poly fill pad is then surrounded by a second layer of cellophane, SARAN WRAP®, or materials with similar properties. In some embodiments, the layers can be reversed. In either case, a wrapping includes a final layer that completely covers the first and second (or more) layers. Embodiments described herein optimize layer structures for cushioning and leg wrapping uses.

Temperature stabilization may be accomplished through a novel use of material, as described herein. When the body surface temperature increases, the material absorbs heat. When the body temperature lowers, the materials prevent the temperature from dropping. Therefore, thermal energy diffuses or is retained. The ambient temperature remains stable helping keep, for example, the horse and/or rider's temperature comfortable, thereby improving the performance and comfort of the horse and/or rider. Thus, embodiments described herein may provide a material or combination of materials that are self-adhesive, elastic, temperature stabilizing, and compressible. In some embodiments, the material may be relatively tough, durable, lightweight and relatively permeable to air and water vapor. Some embodiments provide a self-adhesive wrap or bandage composed substantially or entirely of materials that impart properties to the wrap or bandage that make the wrap or bandage elastic, compressible, relatively permeable to air and/or water vapor and inexpensive such that the wrap or bandage may be disposable.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

Reference will now be made to figures wherein like structures will be provided with like reference designations. It is understood that the drawings are diagrammatic and schematic representations of exemplary embodiments of the present invention, and are neither limiting nor necessarily drawn to scale. Further, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Terminology

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and embodiments including such features or steps need not necessarily be limited to the three features or steps. Labels such as "left," "right," "front," "back," "top," "bottom," "clockwise," "counter clockwise," or other similar terms are used for convenience and are not intended to imply, for example, any particularly fixed location, orientation, or direction. Instead, such labels are used to reflect, for example, relative location, orientation, or directions. As used herein, the terms, "front," "rear," "left," and "right" are used in reference to the animal on which the wraps or pads are being applied. Singular forms of "a," "an," and "the" include plural references unless the context clearly dictates otherwise.

As used herein the terms "inner" and "outer" are used in reference to a skin surface of the animal. For example, an inner layer would be a layer relatively proximate the skin surface of the animal compared with an outer layer. Similarly, an inner surface is a surface relatively proximate to a skin surface of the animal compared with an outer surface. As used herein a "thickness" or "depth" of a wrap or pad is in reference to a distance extending normal to a skin surface of the animal.

Unless defined otherwise, all technical and scientific terms used herein have the same meaning as commonly understood by those of ordinary skill in the art.

DETAILED DESCRIPTION OF PREFERRED EMBODIMENTS

Embodiments described herein provide polymeric compositions for use as equine wrappings and cushioning components of equestrian gear that provide unique mechanical attributes and novel moisture and thermal performance characteristics. Certain polymeric materials may be attached or used in combination with natural fibers and other organic materials from natural plant or animal sources. Mechanical attributes may include improved performance for wicking, absorbency, thermal stability, gas permeation, compression, ease of use and cost. In some embodiments, high friction surfaces against the animal skin and across the material surface prevent slipping and require less compression to remain in place.

Figure 1:
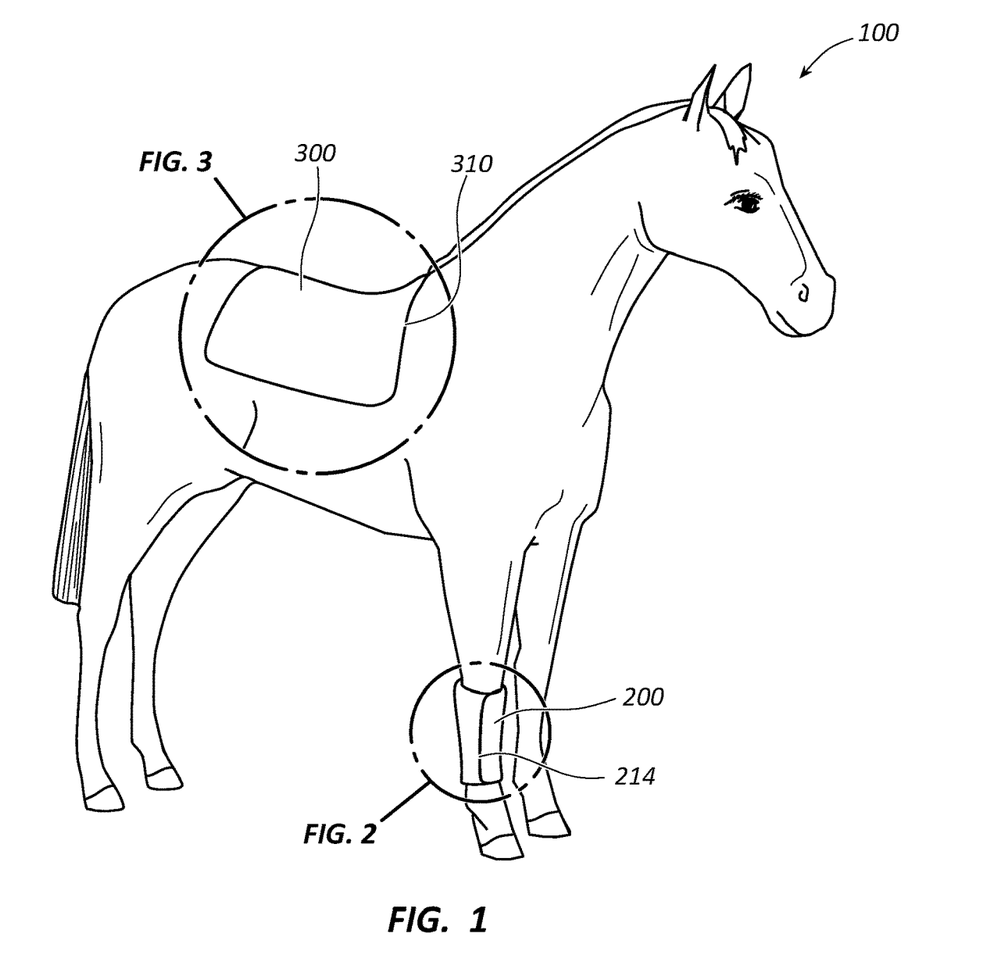
FIG. 1 shows an exemplary use environment wherein a wrap and a pad are disposed on an exemplary animal, according to the present disclosure.

FIG. 1 shows an exemplary use environment 100 for embodiments of the wraps and pads as disclosed herein. In an embodiment, a leg wrap 200 is described that can be disposed about a lower limb of an animal. In an embodiment, a saddle pad 300 is described that can be disposed on a back portion of the animal. The wrap 200 and/or pad 300 can be disposed against a skin surface of the animal, optionally additional wraps, tape, bandages, pads, equipment, saddles, or the like can be disposed on an outer surface thereof. As used herein the wrap 200 and/or pad 300 are used in reference to equine animals although it will be appreciated that embodiments disclosed herein can be used with any animal. Similarly, although the wrap 200 is shown as disposed on a lower limb, and the pad 300 is shown as disposed on a back portion of the animal, it will be appreciated that embodiments disclosed herein can be used on any portion of the body.

In an embodiment, the wrap 200 can be a substantially rectangular shape with a width of between 10 cm and 50 cm and length of between 15 cm and 100 cm. In a preferred embodiment the wrap has a width of 30 cm and a length of 50 cm. A thickness of the wrap 200 can be between 0.5 cm and 15 cm. It will be appreciated, however that other sizes, shapes, and thicknesses are contemplated to fall within the scope of the present invention.

In an embodiment, the pad 300 can be a substantially rectangular shape with a width of between 50 cm and 150 cm and length of between 60 cm and 200 cm. In a preferred embodiment the wrap has a width of 50 cm and a length of 90 cm. A thickness of the wrap 200 can be between 0.5 cm and 5 cm. It will be appreciated, however that other sizes, shapes, and thicknesses are contemplated to fall within the scope of the present invention.

Figure 2:
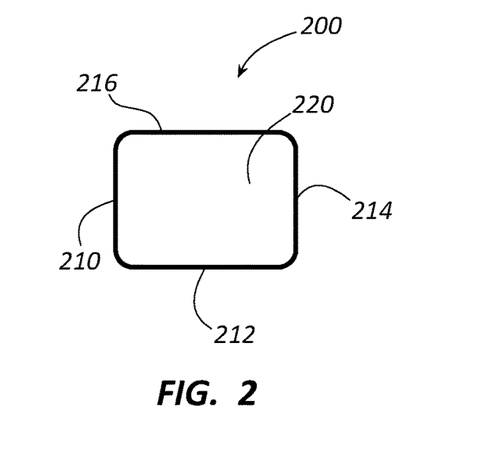
FIG. 2 shows a plan view of a wrap in accordance with an embodiment of the disclosure.

FIG. 2 shows an embodiment of a wrap 200. The wrap 200 includes a wrap body 220 defined by one or more edges, for example, first, second, third, and forth edges, 210, 212, 214, 216. The wrap 200 can include one of more layers of material, embodiments of which are described herein. In an exemplary method of use, the wrap 200 can be applied to a lower limb of the animal. A first edge 210 of the wrap 200 can be aligned with an axis of the limb, for example, when the animal is in a standing position the first edge 210 will be aligned vertically. The wrap body 220 can then be wrapped clockwise or counterclockwise about the limb until a third edge 214, opposite the first edge 210, contacts an outer surface of the wrap body 220. In an embodiment the wrap 200 includes an adhesive or high friction layer disposed on an inner surface thereof that helps secure the wrap 200 in place by adhering or gripping the skin surface of the animal, and/or the outer surface of the wrap 200. Optionally, additional bandages, wraps, tape, or the like can be used to secure the wrap 200 in place. As shown in FIG. 2, the first edge 310 defines a width of a substantially rectangular wrap 200, however, in an embodiment, the first edge 310 can define a length of a substantially rectangular wrap 200.

Figure 3:
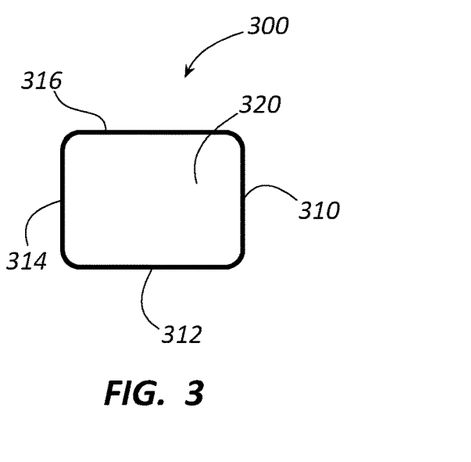
FIG. 3 shows a plan view of a pad in accordance with an embodiment of the disclosure.

FIG. 3 shows an embodiment of a pad 300. The pad 300 includes a pad body 320 defined by one or more edges, for example, first, second, third, and forth edges, 310, 312, 314, 316. The pad 300 can include one of more layers of material, embodiments of which are described herein. In an exemplary method of use, the pad 300 can be applied to a back portion of the animal. A first edge 310 of the pad 300 can be aligned with a transverse axis of the animal, substantially adjacent a shoulder portion of the animal. The pad body 320 can then extend rearwards across a back portion of the animal. In an embodiment, the pad 300 includes an adhesive or high friction layer disposed on an inner surface thereof that helps secure the pad 300 in place by adhering or gripping the skin surface of the animal. Optionally, additional blankets, pads, saddles, or similar equipment can be disposed on an outer surface thereof and can further secure the pad 300 in place. As shown in FIG. 3, the first edge 310 defines a width of a substantially rectangular pad 300, however, in an embodiment, the first edge 310 can define a length of a substantially rectangular pad 300.

In embodiments described herein, the wrap 200 and pad 300 includes one or more layers of material that provides improved moisture wicking and absorption properties, improved ventilation, improved thermal management, improved shock absorbing properties from physical trauma, and improved compression support properties.

Advantageously, this provides a wrap 200 and pad 300 which removes moisture away from a skin surface of the animal, keeps a skin surface therebeneath relatively cooler. The moisture can either be wicked away from the skin surface and an allowed to evaporate from improved ventilation, or can be locked within a layer of the wrap or pad using super absorbent polymer material. The improved ventilation also allows a skin surface remain cool. Further, the improved moisture wicking and ventilation properties prevent the buildup of bacteria, fungi, and the like, which results in unhygienic conditions. This is particularly important should any skin trauma occur in the area of the wrap or pad. For example, the lower limbs of horses are highly susceptible to trauma from contact with other objects or kicks from other animals. Similarly, the back portion of the horse beneath the saddle can develop pressure sores. In addition to providing improved moisture wicking and ventilation, the wrap or pad can include improved cushioning properties that prevent skin trauma from kicks or sores, as described herein. In an embodiment the wrap or pad includes a super absorbent polymer material that increases in volume as it absorbs moisture, this in turn provides improved cushioning from trauma. In an embodiment, the wrap or pad can provide improved compression support properties. Embodiments include materials with improved tensile strength to allow the wrap to be wrapped tightly around the limb without tearing.

Advantageously, embodiments described herein include materials that are cost effective to produce and readily degradable, this provides a wrap or pad that is disposable after use. As such a user can provide new, clean and dry wraps and pads with each use. This prevents the buildup of unhygienic conditions. In an embodiment, the wrap or pad can be washed and reused a limited number of times before being disposed of. Further, the materials used are non-toxic to the animals should portions of the wrap 200 or pad 300 be chewed or swallowed.

FIGS. 4-14 show exemplary embodiments of the structure of the wrap 200 or pad 300. These embodiments are in reference to either the wrap 200 or the pad 300, accordingly where reference is made to only one of a wrap or pad, it will be appreciated that the construction of the other is also contemplated. As shown in FIGS. 4-14 a lower surface or layer is considered relatively proximate to a skin surface of the animal and therefore synonymous with a relatively inner surface or layer. Similarly, an upper surface or layer is considered relatively further from a skin surface of the animal and therefore synonymous with a relatively outer surface or layer. It will be appreciated that these are exemplary embodiments and that the order, number, and type of layers can vary from that shown. Further, embodiments can include one or more layers from other embodiments described herein.

Figure 4:
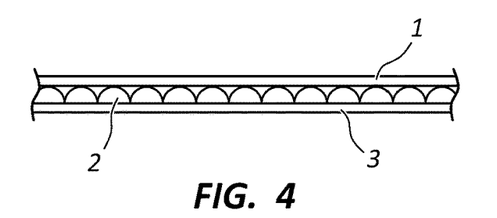
FIG. 4 is a schematic side cross-sectional view of a multilayer composite material in accordance with an embodiment of the disclosure.

In an embodiment, as shown in FIG. 4, a wrap includes a composition having a wax-nylon mix forming a first, outer layer 1, the first layer 1 is in contact with a second layer 2 that includes felting pads, the second layer 2 is in contact with a third, inner-most layer 3 which includes natural fibers.

Figure 5:
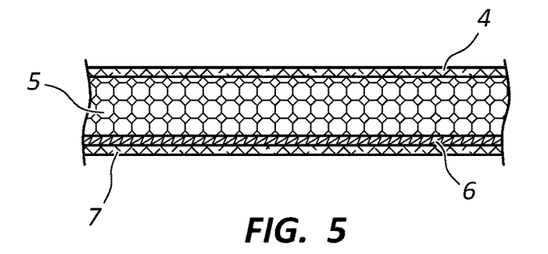
FIG. 5 is a schematic side cross-sectional view of a multilayer wrap material in accordance with an embodiment of the disclosure.

In an embodiment, as shown in FIG. 5, a wrap is comprised of an outer layer 4 that includes a sheet of natural fiber. The outer layer 4 is in contact with a plastic layer 5 that includes a honeycomb structure. In an embodiment, the honeycomb structure is oriented so that an axis of the cells are normal to a skin surface of the animal. In an embodiment, the honeycomb structure is oriented so that an axis of the cells are parallel to a skin surface of the animal. The honeycomb plastic layer 5 is in contact with a webbing layer 6. The plastic layer 5 and webbing layer 6 can be adhered thereto to provide strength. In an embodiment, webbing layer 6 is disposed on an inner layer 7, the inner layer 7 including natural fibers. In an embodiment, webbing layer 6 is disposed within the inner layer 7 such that the webbing layer 6 and inner layer 7 are interwoven.

Figure 6:
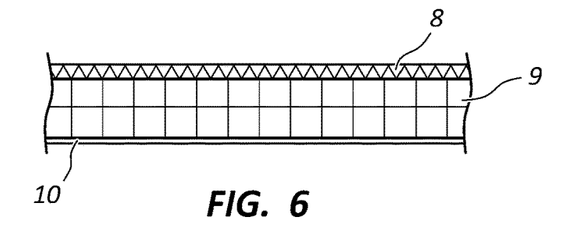
FIG. 6 is a schematic side cross-sectional view of a multilayered material in accordance with an embodiment of the disclosure.

In an embodiment, as shown in FIG. 6, a wrap includes three layers, outer layer 8 includes a cotton material, or a cotton substitute material. The outer layer 8 is in contact with a center layer 9, the center layer 9 includes an open cell foam material. The center layer 9 is in contact with an inner layer 10. The inner layer 10 includes SARAN WRAP®, or similar polyethylene food wrap.

Figure 7:
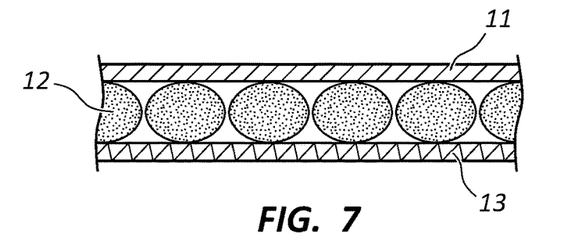
FIG. 7 is a schematic side cross-sectional view of a multilayered material in accordance with an embodiment of the disclosure.

In an embodiment, as shown in FIG. 7, a wrap includes highly cushioning characteristics and includes an outer layer 11. The outer layer 11 includes a cotton material or a cotton substitute material, and is disposed on a middle layer 12. The middle layer 12 includes a cushioning material, for example a polymer layer pad comprising polymer cells. In an embodiment, the polymer cells are surrounded by a second material, for example the cotton material or a cotton substitute material of the outer layer 11, although other materials are also contemplated. The middle layer 12 is in contact with an inner layer 13, the inner layer 13 including a webbing material.

Figure 8:
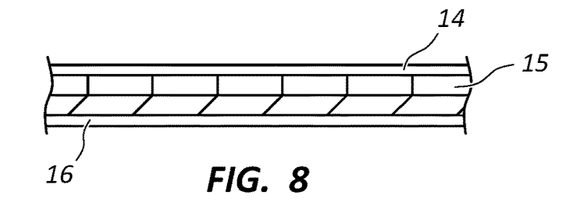
FIG. 8 is a schematic side cross-sectional view of a multilayered material in accordance with an embodiment of the disclosure.

In an embodiment, as shown in FIG. 8, a wrap includes a triple layer wrapping composite having an outer layer 14, the outer layer 14 including natural fibers. The outer layer 14 is in contact with a central layer 15, the central layer 15 including quilted fibers that contain a hydrogel super absorbent polymer material. The central layer 15 is in contact with an inner layer 16, the inner layer 16 including natural fibers.

Figure 9:
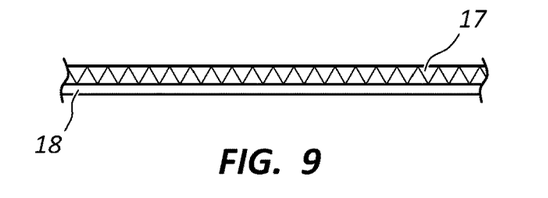
FIG. 9 is a schematic side cross-sectional view of a multilayered material in accordance with an embodiment of the disclosure.

In an embodiment, as shown in FIG. 9, a wrap includes a two-layer composite material. An outer layer 17 includes synthetic fibers and an inner layer 18 includes natural fibers.

Figure 10:
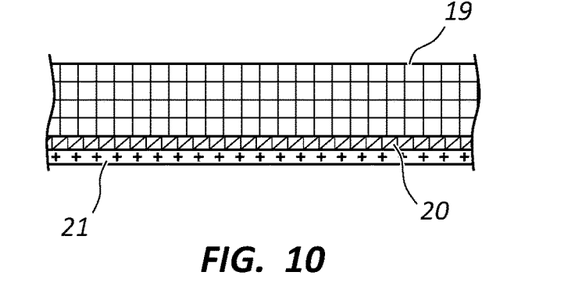
FIG. 10 is a schematic side cross-sectional view of a multilayered material in accordance with an embodiment of the disclosure.

In an embodiment, as shown in FIG. 10, a wrap includes a three-layer structure. An outer layer 19 includes an open or closed cell foam, and is in contact with a center layer 20. The center layer 20 includes a reinforcing webbing, and is in contact with an inner layer 21. The inner layer 21 including a high surface friction adhesive.

Figure 11:
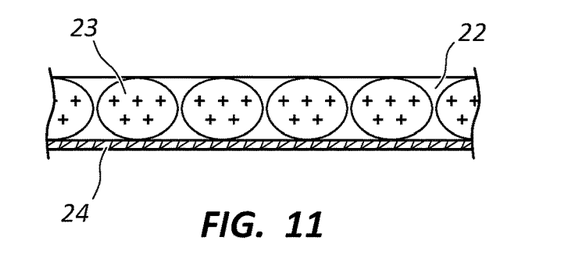
FIG. 11 is a schematic cross-sectional view of a composite material including a matrix material with filler materials interspersed therein in accordance with an embodiment of the disclosure.

In an embodiment, as shown in FIG. 11, a wrap includes a composite outer layer 22, the outer layer 22 including a matrix of quilted cotton. The composite outer layer 22 includes cells 23 disposed therein, the cells 23 including a closed cell foam. The composite outer layer 22, is disposed on an inner layer 24, the inner layer 24 including an adhesive.

Figure 12:
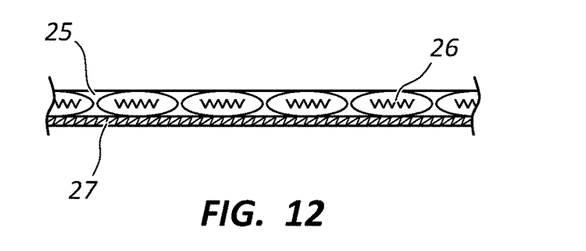
FIG. 12 is a schematic cross-sectional view of a composite material including a matrix material with filler materials interspersed therein in accordance with an embodiment of the disclosure.

In an embodiment, as shown in FIG. 12, a wrap includes a composite outer layer 25, the outer layer 25 including a matrix of quilted yarn, and including cells 26 of synthetic filaments disposed therein. In an embodiment, the cells 26 includes groups or concentrations of synthetic filaments interwoven within the quilted yarn of the outer layer 25. In an embodiment, the cells 26 define distinct pockets of synthetic filaments within the quilted yarn of the outer layer 25. The composite outer layer 25, is in contact with an inner layer 27. The inner layer 27 including a wool-rayon lurex composite material.

Figure 13:
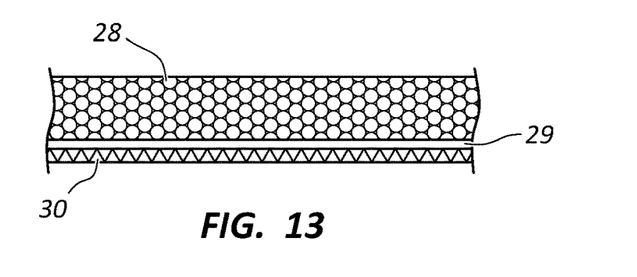
FIG. 13 is a schematic side cross-sectional view of a multilayered material in accordance with an embodiment of the disclosure.

In an embodiment, as shown in FIG. 13, a wrap includes a three-layer construction. An outer layer 28 including an open or closed cell foam. The outer layer 28 in contact with a center layer 29, the center layer 29 including a SPANDEX™ material, or similar polyether-polyurea copolymer. The center layer 29 is in contact with an inner layer 30. The inner layer 30 including a reinforced webbing providing strength characteristics.

Figure 14:
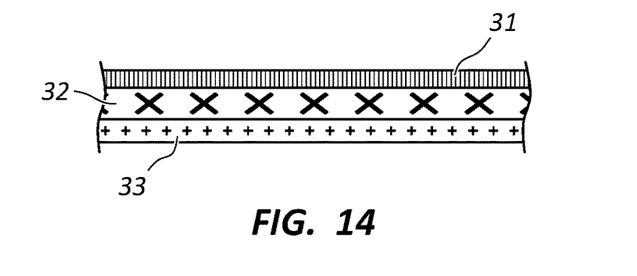
FIG. 14 is a cross-sectional view of a multilayered material in accordance with an embodiment of the disclosure.

In an embodiment, as shown in FIG. 14, a wrap includes a three-layer construction providing cushioning and impact resistance. An outer layer 31 includes natural fibers and is in contact with a center layer 32. The center layer 32 includes a wadding material and is in contact with an inner layer 33. The inner layer 33 including synthetic fibers.

Materials

Embodiments of the wrap and pad include a multi-layered composite construction, as described herein. Details of the materials used are also described herein. The materials and composites described, as well as the ranges provided, are exemplary, and other combinations and ranges are contemplated.

It is noted that Keratin is one of the most important structural proteins in nature and is widely found in the integument in vertebrates. It is classified into two types: α-helices and b-pleated sheets. Keratinized materials can be considered as fiber-reinforced composites consisting of crystalline intermediate filaments embedded in an amorphous protein matrix. In an embodiment, Keratin containing materials are included within the wrap and provide a Young's Modulus of between 2.5 GPa to about 10 MPa and tensile strengths of between 2 MPa to about 530 MPA.

In an embodiment, a super absorbent polymer "SAP," or slush powder, can be used as a component material of a wrap. Table 1, below provides some exemplary SAP materials. SAP can absorb and retain extremely large amounts of a liquid relative to their own mass. SAP, and similar water-absorbing polymers which are also referred to as hydrogels, when cross-linked, absorb aqueous solutions through hydrogen bonding with water molecules. In deionized and distilled water, a SAP may absorb 300 times its weight (from 30 to 60 times its own volume) and can become up to 99.9% liquid, but when expose to saline solution, absorbency can be up to approximately 50 times its weight. The presence of valence cations in the solution impedes the polymer's ability to bond with the water molecule. The total absorbency and swilling capacity for equine use are high cross-link density polymers that exhibit lower absorbent capacity and swell, but the gel strength is firmer and can maintain particle shape even under modest pressure. This polymerization method results in spherical SAP micro-particles with size range of 1 µm to 2 mm.

TABLE 1

Superabsorbents

| Producer | Product name | Composition | Product form |
| --- | --- | --- | --- |
| Stockhousen | ACRYSORB | Polyacrylate | Powder |
| Chemdal | ARID AL | Polyacrylate | Powder |
| Dow Chemical | DRYTECH | Polyacrylate | Powder |
| Hoechst AG | LAQUASORB | Polyacrylate | Powder |
| Allied Colloids | ALSORB | Polyacrylate | Powder |
| BASF | OASIS | Polyacrylate | Fiber |
| Sanyo | SANWET | Starch grafted acrylate/Polyacrylate | Powder |
| Sumitomo Seika | AQUAKIP | Polyacrylate | Powder |
| Nippon Shokubai | AQUARIQUE | Polyacrylate | Granular |

In an embodiment, a fiber material can include pleated and non-pleated, natural and synthetic fibers. These fibers can have a thread count density from about 35 to about 1,000. The fibers can have a thickness from about 0.22 mm to about 0.65 mm with filament sizes from about 0.012 mm to about 0.095 mm and opening sizes from about 0.3 mm to about 0.9 mm. These fibers have a density from about 0.3 g/cm$^3$ to about 2.1 g/cm$^3$ with tensile strengths from about 165 Mpa to about 740 Mpa. Further, the fiber aspect ratio can be from about 5 to 150. Additionally, the natural fibers having a Tappi 496, 402 tear strength from about 56 to 250 and permeability from about 0.1-110 m$^2$×0.1-110 m$^2$×1015 with Tappi tear resistance from about m49 to m250. Further, treated fibers e.g. tissue, cotton, sponge pulp, can provide absorbency up to 30 times their weight. The cellulose and cellulose acetated fibers can be found dispersed or layers from about 0.5 gsm to about 2,000 gsm. Natural, synthetic, and silicon containing sponges and other fibers can be used having a density from about 172 kg/m$^3$ to about 0.33 grams/cc and ASTM D-1056 compressed about 10% to about 85% from about 2-36 hours or longer, also at +212° F. (+100° C.) and compression deflection from about 0.5 to 15 psi at room temperature and tensile from 5 to 70 psi at 344 kPa. Further, ASTM D-412 water absorption at less than 25% but up to 85% and having linear thermal expansion of 1.8 to about 3.2×10−4 in./in./° F. with a specific heat from 0.3 to 0.8 BTU/lb./° F. and temperature ranges +500° F. (+260° C.)-100° F. (−73° C.). Finally, having an ASTM D-412 elongation from 10% to 75%. Examples of natural and synthetic fibers that be used singularly or in combination with other materials, for example the SAP materials as shown in Table 1. Table 2 illustrates the main properties of synthetic fibers, and Table 3 lists properties of natural fibers. Pads and wraps can include the fiber material in one or more layers of the multi-layer composite construction. Each layer can be between 0.55 mm to about 100 mm in thickness.

TABLE 2

Main Properties of Different Types of Fibers

| Item | Soalon (Triacetate) | Lynda (Diacetate) | Rayon | Polyester | Nylon | Silk | Wool | Characteristics |
|---|---|---|---|---|---|---|---|---|
| Tensile Strength (cN/dtex) | 1.1-1.2 | 1.1-1.2 | 1.5-2.0 | 3.8-5.3 | 4.2-5.6 | 2.6-3.5 | 0.9-1.5 | Tear Wear Elasticity |
| Degree of extensibility (%) | 25-35 | 25-35 | 18-24 | 20-32 | 28-45 | 15-25 | 25-35 | Tear Wear Elasticity |
| Young's Modulus (N/mm$^2$) | 3,920-5,390 | 3,430-4,410 | 8,330-11,280 | 10,790-19,600 | 1,960-4,410 | 6370-11,770 | 1,270-2,940 | Texture |
| Official moisture regain (%) | 3.5 | 6.5 | 11.0 | 0.4 | 4.5 | 11.0 | 15.0 | Sweat absorption/ quick-drying static electricity |
| Degree of cross-sectional swelling (in water) (%) | 2-3 | 6-8 | 65-67 | — | 1.6-3.2 | 19 | 25-26 | Shrinking |
| Specific gravity | 1.30 | 1.32 | 1.50-1.52 | 1.38 | 1.14 | 1.33 | 1.32 | Texture |
| Refractive index | 1.47 | 1.48 | 1.55 | 1.79 | 1.57 | 1.60 | 1.56 | Gloss, Chromogenic quality |
| Softening point Setting properties | Above 250 Has | 200-300 Has some | Does not soften Does not have | 238-240 Has | 180 Has some | Does not soften Does not have | Does not soften Does not have | Dry heat-processed, Pleats retention, Dimension stability |

TABLE 3

| Fiber Layer Characteristics | |
|---|---|
| Fiber Aspect Ratio (Average) | 5-100 |
| Fiber Thickness (Softwood) | 1.5-30 mm |
| Fiber Thickness (Hardwood) | 0.5-30 mm |
| Filled Fiber Content | 1% to 30% |
| Fiber Density | 0.3-0.7 g/cm$^2$ |
| Fiber Diameter | 16-42 microns |
| Fiber Coarseness | 16-42 mg/100 m |
| Fiber Pulp Types (Single- to Triple-Layered) | Mechanical, Thermo-Mechanical, Chemi-Thermo-Mechanical, and Chemical |
| Permeability | 0.1-110 m$^2$ × 10$^{15}$ |
| Hydrogen Ion Concentration | 4.5-10 |
| Tear Strength (Tappi 496, 402) | 56-250 |
| Tear Resistance (Tappi 414) | m49-250 |
| Moisture Content | 2%-18% by Weight |

In an embodiment, a webbing material or layer includes a high strength woven or non-woven fibrous webs. The integration of webbing into one or more layers of the wrap adds significant strength and tenacity. Exemplary webbing materials include nylon, polypropylene, miscellaneous polyolefin, polyester, or the like. The webbing material can also include exceptionally high-strength material, such as Dyneema, PVC, and Kevlar and the structure can also contain porous non-woven fibrous webs. The webbing material is both light and strong, with breaking strengths of between 500 lb. to about 10,000 lb. (2.22 kN to 44.48 kN). The webbing material can be between 0.2 mm to about 50 mm in thickness. The webbing material can include very high strength from between about 0.5 g/den to 10 g/den and elongation of up to 50% at break. The webbing material can include a three dimensional or flat honeycomb structure. In an embodiment, a webbing layer, particularly using fibrils, can itself include multiple composite layers. Table 4, below, provides exemplary embodiments of multiple composite layered webbing material.

TABLE 4

Examples of Non-Interspersed (Multilayered) Equine Composite Layers

| Layer Structure | Example 1 | Example 2 | Example 3 | Example 4 | Example 5 | Example 6 |
|---|---|---|---|---|---|---|
| Monolayer (1) | LDPE | HDPE | LDPE-HDPE resin blend | LDPE-MMW HDPE resin blend | LLDPE-LDPE resin blend | PLA-bio derived starch based resin blend |
| Monolayer (2) | Bio-derived, starch polymer blend | LDPE-bio derived starch polymer blend | LDPE-LLDPE-bio derived starch polymer blend | LDPE-HDPE-LLDPE- blend | PP-bio derived starch based polymer blend | ULDPE-HDPE-bio derived starch polymer blend |

TABLE 4-continued

Examples of Non-Interspersed (Multilayered) Equine Composite Layers

| Layer Structure | Example 1 | Example 2 | Example 3 | Example 4 | Example 5 | Example 6 |
|---|---|---|---|---|---|---|
| 3-Layer 4-Layer | HDPE-LDPE EVA-ethylene vinyl acetate EEA-ethylene acrylic acid-HDPE-EAA ethylene acrylic acid | HDPE-PP HDPE-EVA-Ionomer resin-Polyamides- | HDPE-PET Biaxially oriented homopolypropylene-polyester-polypropylene-PE | LDPE-PP Oriented polypropylene-HDPE-PE-metallized PET | LLDPE-PET EVA-PE-MMWHD PE-oriented polypropylene | EVA-LDPE PVC-ABS-PC Nylon |

In an embodiment, the wrap includes a composite material. The composite material includes an outer, fiber containing layer, and an inner layer bonded to the outer, fiber-containing layer. The layer or layers may include a three-dimensional matrix of a polymer defined within different structures having densities from about 0.82 g/cm$^3$ to about 1.65 g/cm$^3$. In an embodiment, the three-dimensional matrix includes cells of polymer material disposed within a matrix of fiber containing material. The polymer bonding agent of the outer and inner layers may include polyolefin or polyester. The polymer bonding agent may have an isotactic run length from about 1 to about 40. The polymer bonding agent may have a shear rate from about 1 to about 10,000 at temperatures from about 180° C. to about 410° C. For layer bonding purposes, the outer layer may provide hot tack operating ranges from about 25° C. to about 225° C. having from about 1.0 N/mm to about 50.0 N/mm seal strengths. The polymer bonding agent may comprise a polyethylene copolymer, and the outer layer may provide hot tack operating ranges from about 80° C. to about 220° C. having from about 10 N/mm to about 60 N/mm seal strengths. Any layer having structure that may be about 20% to about 60% amorphous and about 20% to about 55% crystalline. The outer layer may have a density from about 1.05 g/cm$^3$ to about 1.65 g/cm$^3$.

Embodiments include a method of making a wrap for use on equines limbs from a sheet of a multilayered composite material. The sheet may include a fiber-containing layer and a mineral containing layer. The method may include cutting the sheet into a desired shape, folding the sheet to form a three-dimensional shape, and heat sealing abutting surfaces of the container to secure the abutting surfaces to one another. The heat sealing may be performed under the following conditions: a dwell time in the range from about 0.30 seconds to about 15 seconds, a temperature range from about 115° C. to about 240° C., and a seal pressure at or below about 0.80 MPa. The folding may be performed manually or by machine. The three-dimensional shape may comprise substantially a tube shape, box shape, container liner, or envelope, although other three-dimensional shapes are contemplated to fall within the scope of the present invention depending on the particular area of the animal the wrap or pad is to be applied. The peel strengths between the heat sealed abutting surfaces may range from about 1 J/m$^2$ to about 45 J/m$^2$.

In an embodiment, a method of making a wrap from a sheet of a composite material is described. The sheet includes a nanofiber, fibrous, fibril, natural cellulose, or synthetic cellulose also possibly containing layers comprised of animal derived materials. The method may include cutting the sheet into a desired shape, folding the sheet to form a three-dimensional shape, and heat sealing or adhesive layer to a surface of the inner or outer layer. The heat sealing is performed in a temperature range from about 25° C. to about 225° C., with a dwell time from about 0.01 seconds to about 6.0 seconds, and produces seal strengths from about 1.0 N/mm to about 50 N/mm. The folding may be performed manually or by machine. The multi-dimensional shape may comprise a substantially cylindrical tub shape, a box shape, container liner, or envelope, although other three-dimensional shapes are contemplated to fall within the scope of the present invention depending on the particular area of the animal the wrap or pad is to be applied. The three-dimensional shape may comprise an inner layer making partial, intermittent, or complete contact with the equine skin surface. The three-dimensional shape or construction may comprise a low, medium, high friction, or self-adhering surface.

In an embodiment, the wrap or pad can further include homogeneous blends of solid olefin polymers with varying densities and melt indexes. These homogeneous blends of solid olefin polymers can be mixed with one or more layers of material, impact cushioning composite layers, or the like, and can either be interspersed or non-interspersed through extrusion and other manufacturing methods. The composite layer(s) can be applied and bonded substantially and continuously on at least a fiber-containing layer using extrusion or extrusion lamination, including blown film, cast, or extrusion coating methods. Polymer content can be used as a tie layer for interspersed and non-interspersed constructions as well as particle bonding agents within each individual layer. These bonding agents or tie layers can include individually, or in mixtures, polymers of monoolefins and diolefins, e.g. polypropylene, polyisobutylene, polybut-1-ene, poly-4-methylpent-1-ene, polyvinylcyclohexane, polyisoprene or polybutadiene, homogeneous mettallocene copolymers, and polymers of cycloolefins, e.g. cyclopentene or norbomene, polyethylene, cross-linked polyethylene, ethylene oxide and high density polyethylene, medium molecular weight high density polyethylene, ultra-heavy weight high density polyethylene, low density polyethylene, very low density polyethylene, ultra-low density polytheylene; copolymers of monoloefins and diolefins with one another. or with other vinyl monomers, e.g. ethylene/propylene copolymers, linear low density polyethylene, and blends thereof with low density polyethylene, propylene but-1-ene copolymers, ethylene, propylene/isobutylene copolymers, ethylene/but-1-ene copolymers, ethylene/hexene copolymers, ethylene/octene copolymers, ethylene/methyl epentene copolymers, ethylene/octene copolymers, ethylene/vinylcyclohexane copolymers, ethylene/cycloolefin copolymers, COC, ethylene/I-olefin copolymers, the I-olefin being produced in situ; propylene/butadiene copolymers, isobutylene/isoprene copolymers, ethylene/vinylcyclohexene copolymers, ethylene vinyl acetate copolymers, ethylene/alkyl methacrylate copolymers, ethylene/acrylic acid copolymers or ethyelene/acrylic acid copolymers and salts thereof (ionomers) and terapolymers of ethylene with propylene and diene, such as, for example, hexadiene, dicyclopentadiene or ethylidenenorbomene; homopolymers and copolymers that may have any desired three dimensional structure (stereostructure), such as, for example, syndiotactic, isotactic, hemiisotactic or atactic stereoblock polymers are also possible; polystyrene, poly methylstyrene, poly alph-methystyrene, aromatic homopolymers and copolymers derived from vinylaromatic monomers, including styrene, alpha-methylstyrene, all isomers of vinyltoluene, in particular p-vinyletoluene, all isomers of ethylstyrene, propylstyrene, vinylbiphenyl, vinylnaphthalene and blends thereof, homopolymers and copolymers of may have any desired three dimensional structure, including syndiotactic, isotatic, hemiisotactic or atactic, stereoblock polymers; copolymer, including the above mentioned vinylaromatic monomers and commoners selected from ethylene, propylene, dienes, nitriles, acids, maleic anhydrides, vinyl acetates and vinyl chlorides or acryloyl derivatives and mixtures thereof, for example styrene/butadiene, styrene/acrylonitrile, styrene/ethylene (interpolymers) styrene/alkymethacrylate, styrene/butadiene/ alkyl acrylate, styrene/butadiene/alkyl methacrylate, styrene/maleic anhydride, styrene copolymers; hydrogen saturated aromatic polymers derived from by saturation of said polymers, including polycyclohexylethylene; polymers derived from alpha, beta unsaturated acids and derivatives; unstaturated monomers such as acrylonitrile/butadiene copolymers acrylate copolymers, halide copolymers and amines from acyl derivatives or acetals; copolymers with olefins, homopolymers and copolymers of cyclic ethers; polyamides and copolyamides derived from diamines and dicarboxylic acids and or from aminocarboxylicacides and corresponding lactams; polyesters and polyesters derived from dicarboxylic acids and diols and from hydroxycarboxylic acids or the corresponding lactones; blocked copolyetheresters derived from hydroxyl terminated polyethers; polyketones, polysulfones, polyethersufones, and polyetherketones; cross-linked polymers derived from aldehydes on the one hand phenols, ureas, and melamines such as phenol/ formaldehyde resins and cross-linked acrylic resms derived from substantial acrylates, e.g. epoxyacrylates, urethaneacrylates or polyesteracrylates and starch; polymers and copolymers of such materials as poly lactic acids and its copolymers, cellulose, polyhdyroxy alcanoates, polycaprolactone, polybutylene succinate, polymers and copolymers of N-vinylpyrroolidone such as polyvinylpyrrrolidone, and corsslinked polyvinylpyrrolidone, ethyl vinyl alcohol. More examples of thermoplastic polymers suitable for the mineral-containing composite include polypropylene, high density polyethylene combined with MS0825 Nanoreinforced POSS polypropylene, thermoplastic elastomers, thermoplastic vulcinates, polyvinylchloride, polylactic acid, virgin and recycled polyesters, cellulosics, polyamides, polycarbonate, polybutylene tereaphthylate, polyester elastomers, thermoplastic polyurethane, cyclic olefin copolymer; biodegradable polymers such as Cereplast-Polylactic acid, Purac-Lactide PLA, Nee Corp PLA, Mitsubishi Chemical Corp GS PLS resins, Natureworks LLC PLA, Cereplast Biopropropylene, Spartech PLA Rejuven 8, resins made from starch, cellulose, polyhydroxy alcanoates, polycaprolactone, polybutylene succinate or combinations thereof, such as Ecoflex FBX 7011 and Ecovio L Resins from BASF, polyvinylchloride and recycled and reclaimed polyester such as Nodax biodegradable polyester by P & G and finally PFE by BASF.

In an embodiment, the wrap or pad can weigh in a range of between 0.25 kg to about 7.5 kg having dimensions in parts or as a whole in a range from about 1 mm to 400 mm in the width direction and from about 150 mm to about in the 1,000 mm in the length direction, having a thickness in a range from about 1 mm to about 200 mm that is making contact with the animal skin.

Particularly during exercise, thermal conductivity is a key consideration providing for comfortable wearing conditions. The entire body of composites or the layers contained within can have changing thermal conductivities due to composition. In an embodiment, polymer density from about 0.934 to about 0.956 g/cm$^3$ can have a heat conductivity from about 0.33 to 0.052. In an embodiment, polymers with lower specific gravity can have a heat conductivity from about 0.11 to about 0.52 [W/mK] and densities to about 0.908 to 0.925 g/cm$^3$.

In an embodiment, at least a portion of the wrap or pad, having a structure as described herein, has thermal conductivities [1 W/(m K)=1 W/(m ° C.)=0.85984 kcal/(h m ° C.)=0.5779 Btu/(ft h ° F.)=0.048 Btu/(in h ° F.)=6.935 (Btu in)/(ft$^2$ h ° F.)] of about 0.005 to about 401.00, tensile strength from about 10 mPa to about 500 mPa, densities from about 750 kg/m3 to about 1500 kg/m$^3$, and elongation percentage of from about 5 to about 1,000, a Youngs Modulus from about 0.20 Gpa to about 4.0 Gpa, a Brinell Hardness number from about 2 to about 45.

In an embodiment, an adhesive layer can include adhesives suitable for cold, wet, or dry strength applications in calipers from about 0.75 mil to about 10 mil. Exemplary adhesives include emulsion acrylics contacting metals, polyesters, polymers, and glass-containing surfaces. In an embodiment, the adhesive layer has loop tack of between 1.5 lbs. to about 3.5 lbs. and corresponding peel adhesion of between 0.5 to about 4.0 lbs. Surface application temperatures are from a minimum of about −22° F. with service temperatures from about −70° F. to about 220° F.

In an embodiment, the layers of the wrap or pad can functionally contact one or more polymer or polyester containing layers within the wrap structure, often but not limited across a web, having calipers from about 0.50 mil to about 2.5 mil and MD-CD tensile strengths from about 15,000 psi to about 60,000 psi and from about 16,000 psi to about 55,000 psi. The layers can be functionally bonded to internal and external layer surfaces and have at least one of its surfaces applied to the outer portion of the destination surface, e.g. a skin surface of an animal. Non-limiting adhesives that can be used for bonding the layer to the destination surface can include polyesters with crystallization rates of from about 40 to about 90 and for polycarbonates from about 45 to about 90, having low to high heat resistance and thermo-plasticity as measured at about 60° C.

Exemplary adhesive characteristics for between wrap layers and other surfaces within the structure of the wrap, or as an outer or inner surface area bonded to the destination surface, may include adhesives having, without limitation: a DOT-T Peel of 1 N or more on Kraft paper as measured by ASTM 1876, a heat of fusion of 1-70 Jig and molecular weight up to about 60,000, having one of more tackifiers including aliphatic hydrocarbon resins, aromatic modified aliphatic hydrocarbon resins, hydrongenated polycyclopentadiene resins, polycyclopntadiene resins, gum rosins, gum rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated rosin esters, derivatives thereof, and/or combinations thereof.

Exemplary adhesive characteristics between at least one side of layer and other surfaces within the layers, or between the mineral-containing layer as an outer or inner surface area bonded to the destination surface, may include, without limitation, adhesives having one or more waxes such as polar waxes, non-polar waxes, oxidized and non-oxidized Fischer-Tropsch waxes, hydroxystearamide waxes, functionalized waxes, PP waxes, PE waxes, wax modifiers, and combinations thereof. The adhesive additives may include plasticizers, oils, stabilizers, antioxidants, pigments, dyestuffs, polymeric additives, defoamers, preservatives, thickeners, rheology modifiers, humectants, fillers, and water. The adhesive may contain as desired aliphatic oils, white oils, combinations thereof, and/or derivatives thereof.

Exemplary functional bonding characteristics between the wrap layers and other surfaces within the completed structure or between the layer as an outer or inner surface area bonded to the destination surface, may include adhesives having, without limitation, polymeric additives including homo poly-alpha-olefins, copolymers of alpha-olefins, copolymers and terpolymers of diolefins, elastomers, polyesters, block copolymers, ester copolymers, acrylate polymers, alkyl acrylate polymers, and vinyl acetate polymers. Exemplary adhesive attributes of the surface area bonded to the destination surface, may include non-hot melt adhesives having, without limitation, pH levels from about 6.5 to about 8.8, boiling points for non-hot melt at approximately 212° F., specific gravity from about 0.89 to about 1.61 g/cm', solids content from about 20% to about 85%, viscosities from about 70 mPas to about 150 mPas being units of multiple millipascal seconds and running temperatures up to 375° F.

In an embodiment, the wrap or pad structure can include a quilted yarn material. The quilted yarn material includes a layer or layers including all types of quilted structures and containing various types of yarns. Exemplary yarns include PBT, z-twist, spun bound, curled, peaked crimp, rounded crimp, heated gears, elastic core spun yarns, elastic twisted yarns, and elastic wrapped spun yarns, elastic core spun ring yarns, wool, synthetic wool, punched felt, wool cashmere, wool felt, pressed wool, down, wool fabric, cable net wool, Herringbone Tulle wool fabric, wool crepe fabric, acrylic fibers, acrylic wool, viscose fabrics, merino wool fetting pads, silk, SPANDEX™ fabrics, pressed merino wool, merino wool, wool fiber, polyester fiber yarns, stuffing box, high twist, synfoam, velvet, synthetic velvet, cellophane, stretch-core, SPANDEX™, lofted air jet, SPANDEX™ fabrics, thermal cellulose cotton, cellulose acetate, rayon, high wet modulus rayon, high tenacity rayon, HCS polyester, cupramonium rayon, wool-rayon-lurex composites, boucle fabric, basolanwool, cotton down proof fabric, basonlan wool-camel-cashmere composites, camel, polyamide fibers, polyamide, rayon micro-fibers less than 1 denier, polyester loop pile, high bulk, curled, ring, solo, siro core spun, spun bound polyurethane micro fibers, cotton elastic core spun yarns mono filament, spun, spun bound, s-twist, z-twist, core spun, PET/PTT bi-component filament, cotton and stretched. Natural or synthetic wool and other fibers having a dry tensile strength from about 1.0 to 1.70 and wet tensile strength from about 0.80 to about 1.60, a dry elongation at break from about 15% to about 45% and wet elongation at break from about 10% to about 70%, a standard moisture regain MR % of from about 5% to 50%. The yarn construction can provide from about 10 deniers to about 120 deniers. Further, elastic core spun yarn having from about a 1.5 to about 6.0 with an elastic yarn draw ratio up to 60%. Additionally, the draw ratio of elastic core and other yarns e.g. (SPANDEX™ filament 44 dtex/f4) can be from about 2.0 to about 5.0. Further, twist type and other yarns can provide from about 10% to about 80% in fine deniers and will bulk up to 400% when relaxed. Finally, the previously mentioned yarns and other materials can provide a tenacity of about 14 cN/tex to about a 25 cN/tex, an elongation at break ratio of about 7.0% to about 15%, and elastic recovery ratio of about 35% to about 70%, thin places [(−30%), km-1] from 150 to 550, and hair-ness per 1 m of about 0.002 to about 1.75. Further, polyester materials used can include, polyester-staple fiber, partially oriented yarn, drawn textured yarn, fully drawn yarn, amorphous polyester film, and biaxial-oriented polyester film. Layers can be from about 2 mm to about 300 mm thick, having weighted average specific gravity of from about 1.15 gm/cm$^3$ to about 2.75 g/cm$^3$. Finally, the material or materials component(s) having a yarn count up to 85 and needle punch from about 0.2 to about 5.0 g/cm3, polyester taffeta, nylon taffeta, oxford, polyester pongee, satin, and fleece fabric with thread count densities up to 750T. All the above stated materials and structures including the other materials contained within this application can be used as fillings singly or in combination and contained within one or more layers and can be constructed in micro fibers having less than two microns in width.

In an embodiment, wraps or pads described herein include a cushioning material. The cushioning material can include compression, memory, and impact resistant layers that contain open and closed cell foam structures from about 0.15 inch (3.81 mm) to about 8.0 inch (203.2 mm) in thickness as well as having lightweight, abrasive and non-abrasive surfaces and are easy to fabricate. Some floating closed cell foams are non-water absorbent, non-biodegradable, have low tensile strengths, and are impervious to petroleum. As used herein, the cushioning material can include foam structures similar to that found in exercise mats, yoga mars, aerobic high impact equipment, or the like. In an embodiment, these cushioning materials can be from about 0.15 inch (3.81 mm) to about 1.25 inch (31.75 mm) thick. Additionally, cushioning materials, including foam or neoprene containing layers, can also provide non-dusting, superb strength and tear resistance, excellent shock absorption and vibration dampening properties, flexibility, resistance to mildew, mold, rot, and bacteria. Further, these materials are also, resistant to water, chemicals, grease, odorless, buoyant, cost-effective, and finally providing excellent thermal insulation and thermal diffusion properties. In an embodiment, the wrap, including these cushioning materials can comprise entirely or partly of one or more layers of open and closed cell foam. Finally, hydrophilic and hydrophobic foams can also be used with varying thermal conductivities and thermal diffusion rates.

In an embodiment, the wrap or pad structures described herein include closed-cell cross-linked polyethylene foam. Exemplary foams include cross-linked polyethylene foams (also known as XLPE), which is a closed-cell foam characterized by a compact feel and resistance to water. XLPE has many of the same properties as polyethylene foam but also has the ability to protect Class "A" surfaces. Additionally, polyurethane foam offers a variety of mechanical attributes when residing within the structure layers. Characterized by its light weight, resiliency, low odor and high resistance to mildew, polyurethane foam can be used effectively in the structure of wraps and pads described herein. Further, XLPE provides excellent abrasion resistance properties. Polyurethane foam provides excellent cushioning at a very reasonable cost and can be easily molded or cut to fit within the wrap or pad structure and includes both polyether and polyester versions. The layers all or in part spanning a range of densities from about 40.5 gm/cm$^3$ to about 1.25 gm/cm$^3$.

In an embodiment, the cushioning material can include reticulated polyurethane foam, this foam is an open-cell material that is light weight, low odor and highly resistant to mildew, therefore offer advantageous properties applicable for use in equine wrappings and pad cushioning products. This family of materials features high tensile, elongation and tear characteristics. Reticulated polyurethane has a high resistance to chemicals, which makes it an idea for horse sweat barriers on the skin surface of wrapping. Foam technology involves the manipulation of thousands of plastic bubbles (called cells) of precisely controlled sizes. Reticulation is a post process in foam manufacturing that removes the window membranes of the cell. The cells that make up the foam can have many variations, which can also be precisely controlled. Different foams have varying cell structures. However, foams from the same material family can also be made with vastly different density and firmness specifications that will greatly affect their performance when used within equine related industries. Table 5, below shows relative Young's modulus, yield strength, and energy absorption for selected exemplary polyurethane foams. Polyurethane and all other foams described herein can be used as cushioning material inside one or more layers of the wrap or pad.

TABLE 5

Young's modulus (E), Yield strength and Energy absorbed to yield for PU foams under compression

| 9 mm Diameter PU Foam Cylinder | Mean E (MPa) | Median E (MPa) | Mean Yield Strength (MPa) | Median Yield Strength (MPa) | Mean Energy Absorbed to Yield (kJ · m$^{-3}$) | Median Energy Absorbed to Yield (kJ · m$^{-3}$) |
|---|---|---|---|---|---|---|
| 0.09 g · cm$^{-3}$ density foam | | | | | | |
| 3.9 mm length | 0.3 (0.2) | 0.3 | 0.02 (0.01) | 0.02 | 0.001 (0.001) | 0.001 |
| 7.7 mm length | 0.7 (0.2) | 0.7 | 0.04 (0.02) | 0.03 | 0.001 (0.001) | 0.001 |
| 0.16 g · cm$^{-3}$ density foam | | | | | | |
| 3.9 mm length | 19 (3) | 19 | 1.0 (0.1) | 1.0 | 0.03 (0.01) | 0.03 |
| 7.7 mm length | 41 (3) | 42 | 1.1 (1.0) | 1.1 | 0.01 (0.03) | 0.01 |
| 0.32 g · cm$^{-3}$ density foam | | | | | | |
| 3.9 mm length | 66 (13) | 64 | 3.6 (0.5) | 3.6 | 0.10 (0.05) | 0.08 |
| 7.7 mm length | 145 (6) | 146 | 3.3 (0.9) | 3.7 | 0.03 (0.01) | 0.03 |

In an embodiment, one or more layers of the wrap or pad can include Polystyrene (PS). Polystyrene is a synthetic aromatic polymer made from the monomer styrene that could be found as a layer or layer component in equine wrappings or cushioning products and can contain up to 95% air. Polystyrene can be solid or foamed. General-purpose polystyrene is clear, hard, and rather brittle. It is an inexpensive resin per unit weight. It is a rather poor barrier to oxygen and water vapor and has a relatively low melting point and therefore provides excellent permeation of equine sweat and moisture brought the wrap or cushioning pad. It can also be used in composite containing cellulose and starch. Properties of polystyrene are provided below in Table 6.

TABLE 6

| Properties of Polystyrene | |
|---|---|
| Density of EPS | 16-640 kg/m |
| Young's modulus (E) | 3000-3600 MPa |
| Tensile strength (st) | 46-60 MPa |
| Elongation at break | 3-4% |
| Charpy impact test | 2-5 kJ/m$^2$ |
| Glass transition temperature | 100° C. |
| Vicat softening point | 90° C. |
| Coefficient of thermal expansion | 8 × 10$^{-5}$/K |
| Specific heat capacity (c) | 1.3 kJ/(kg · K) |
| Water absorption (ASTM) | 0.03-0.1 |

In an embodiment, one or more layers of the wrap or pad can include Expanded Polystyrene (EPS). Expanded Polystyrene (EPS) is a rigid and tough, closed-cell foam with a normal density range of 11 kg to 32 kg and therefore can be used within the wrapping structure. Typically, EPS is white and made of pre-expanded polystyrene beads. Thermal conductivity is measured according to EN 12667. Typical values range from 0.032 to 0.038 W/(m·K) depending on the density of the EPS board. The value of 0.038 W/(m·K) was obtained at 15 kg/m$^3$ while the value of 0.032 W/(m·K) was obtained at 40 kg/m$^3$ according to the data sheet of K-710 from Styro-Chem Finland. Adding fillers (graphites, aluminum, or carbons) has recently allowed the thermal conductivity of EPS to reach around 0.030-0.034 (as low as 0.029) and as such has a grey/black color which distinguishes it from standard EPS. Several EPS producers have produced a variety of these increased thermal resistance EPS usage for this product in the UK & EU. Water vapor diffusion resistance (μ) of EPS is around 30-70. ICC-ES (International Code Council Evaluation Service) requires EPS boards used in building construction meet ASTM C578 requirements. One of these requirements is that the oxygen index of EPS as measured by ASTM D2863 be greater than 24 per volume %.

According to EPS-IA ICF organization, the density of EPS can be from about 1.35 to 1.80 pcf. This is either Type II or Type IX EPS according to ASTM C578. Extruded polystyrene foam (XPS) consists of closed cells, offers improved surface roughness and higher stiffness and reduced thermal conductivity. The density range is about 28-45 kg/m3. Thermal conductivity varies between 0.029 and 0.039 W/(m·K) depending on bearing strength/density and the average value is 0.035 W/(m·K). Water vapor diffusion resistance (μ) of XPS is around 80-250. Young's modulus values were 0.08-0.93 MPa for the 0.09 g·cm−3 foam and from about 15.1-151.4 MPa for the 0.16 and 0.32 g·cm−3 foam. Yield strength values were 0.01-0.07 MPa for the 0.09 g·cm−3 foam and from 0.9-4.5 MPa for the 0.16 and 0.32 g·cm−3 foam.

In an embodiment, one or more layers of the wrap or pad can include Rigid, closed cell polyurethane (PU) foams. Rigid, closed cell polyurethane (PU) foams, with densities typically ranging from 0.16-0.64 g·cm−3, and open cell with densities of 0.09 g·cm−3 and 0.12 g·cm−3. Additional closed cell foams weighing from about 1.5 lb./cu ft. and having an ASTM D1667 PCF density range from about 1.0 to about 3.0 and ASTM D1056 compression strength, psi with 25% deflection of 4 to 8 and at 50% deflection from about 12 to 20. Further, an ASTM compression set of up to 30% of original thickness per ASTM D1056. Finally, having an ASTM D 1564 tensile strength of from about 25 to 60. Other closed cell PU foams are found having a density 0.16 g·cm−3 and 0.32 g·cm−3 (American Society for Testing and Materials, ASTM, Grade 10 and Grade 20). Further, open cell rigid foam of density 0.09 g·cm−3 to about 0.16 g·cm−3 and to up to about 0.32 g·cm−3 for PU foams. PU foams can have weights within the range of about. 0.9 to about 1.2 lbs. per cubic foot and a specific gravity from about 1.2 lbs. per cubic foot to about 1.6 pounds per cubic food and a tensile strength from about 5.0 lbs./sq. in. to about 8.5 lbs. per sq. inches. Additionally, having a 75% for 22 hours at less than 15%. Higher density material includes weights from about 2.6 lbs. per cubic ft. to about 3.2 lbs. per cubic foot and density from about 1.4 lbs./cu. ft. to about 1.85 lbs./cu. ft. having a sag factor greater than 1.5 and air flow up to about 4.2. The tear strength ranges from about 1.75 lbs./per linear foot to. about 2.5 lbs./linear ft. Tensile strengths from about 8.0 lbs./sq. in. to about 17.0 lbs./sq. in. with elongation from about 110% to about 180%. Further, having a resilience greater than 20 with a compression set less than 15% at 90% at 22 hours and 158 F. The materials passing flammability specifications for Cal. T.B. 117, FMVSS 302, and NFPA 260, 1989 specifications.

In an embodiment, one or more layers of the wrap or pad can include "Lux Foam". This foam having weights from about 1.75 to about 2.5 lbs. cu. ft., and density from about 1.80 to about 2.40 lbs./cu. ft. and tensile strength up to about 18.5 lbs./sq. in., and tear strength up to about 230 having an elongation up to 210%. The tear strength can be up to about 230 lb./in. having a ball rebound % of up to 50 (+5). The compression set of up to 2.60 at 22 hours at 158 degrees F. at approximately a 50% maximum. A higher resilience selection includes foam having densities to about 3.00 lbs./cu ft., and having a support factor to about 3.0 with weights from about 2.75 lbs./cu. ft. to about 4.0 lbs./cu. ft. Further, foams having a hysteresis loss at 25% up to 35% maximum with tear strength up to about 1.25 PLI minimum and tensile strengths from about 12.0 lbs./sq. in. minimum with a 40% or great resilience provide superior performance as individual layers within the structure and also having a less than 15% compression set at 90% for 22 hours at 158 F, passing flammability specifications for Cal. T.B. 117, FMVSS 302, and NFPA 260, 1989 specifications. Another foam material that can be found in the legging or cushioning structure having an Elongation, % to Break (ASTM D1564) of about 120-190 and a tear resistance, lb./in per ADTM D624, further with a water absorption of about 0.05 to about 0.10 lb/ft$^2$ of cut surface, maximum per Mil P-40619. Additionally, a buoyancy of about 40 to 75 lb./cu. ft.: (Mil P-40619) (USCG). Another layer option within the structure includes dry fast foam which is very resilient, open cell foam that can be subject to high amounts of liquid. Exemplary properties of the described foam are illustrated in Table 7, below.

TABLE 7

| Properties of Dry Fast Foam | | | |
|---|---|---|---|
| Weight | 2.15 lb. per cubic ft. | | |
| TEST | MIN | MAX | UNITS |
| Pore Size (Visual): | 15 | 30 | |
| Density: | 1.75 | 2.15 | lbs/ft$^3$ |
| Tensile: | 8 | | psi |
| Elongation: | 100 | | % |
| Tear: | 2.0 | | ibs/in. |
| IFD 25%R: | 30 | 35 | lbs |
| Compression Set 50% | | 15 | % |

In an embodiment, one or more layers of the wrap or pad can include latex or a latex containing foam commonly having weights from up to 7.0 lbs./cu. ft. with densities from about 2.5 lbs./cubic ft. to about 18 lbs./cubic ft. Further, a foam having weights to about 2.5 lbs./cu. ft. and with a density from about 1.50 lbs./cu. ft. to about 2.5 lbs./cu. ft., and with a cell count per linear inch of from about 20 to 50. Finally, having a tensile strength lbs./in. of up to 230. Soft to medium soft visco-elastic foams with a weight from about 2.8 to about 3.5 lb./cu. ft. having a density from about 2.70±15% to 4.5±15% about a 25% IFD up to about 14.00 lbs.±3.0.

In an embodiment, one or more layers of the wrap or pad can include a wadding material. Wadding materials can include single or multiple layers of wadding material and include woven and non-woven materials. Exemplary non-woven materials include PET, cellulose, polyester materials that can be needle punched and thermal bonded, e.g. felt. Exemplary woven materials can include polyester (plain weave, from about 80 g/m2 to about 220 g/m2, up to 45 picks/cm, and up to 31 ends/cm), cotton (plain weave, up to about 250 g/m2, and up to 30 picks/cm, and 40 end/cm) and polyester/cotton from about 30/70 to about a 70/30 blend (twill weave 2/1, up to 220 g/m2, and up to 35 picks/cm, and up to 35 ends/cm). Wadding materials can be adhered to fabrics including cotton, woven, cotton-polyester blends, china silk, cellulose fibrils, and other non-woven. Wadding advantages can include, but not limited to, characteristics such as being hydrophilic, breathable, and tear resistant. Also, natural fiber types, microfiber, Bi-component fiber, can become integrated into the structure. Wadding materials can have a thickness from about 1 mm to about 150 mm, widths from about 15 cm to about 200 cm having length up to about 1000 cm. The wadding weight can be from about 30 gsm to about 1200 gsm. The wadding surface can be glued, adhered, or sewn to an outer layer containing other materials and layers hereto described in this application. Further, mesh fabric manufactured from polyester, polyolefin and other plastics polymers can provide the single or multiple layer structure qualities of shrink resistance and compression memory. Types of mesh fabric can be described as "Spacer", "Leno", "Trampoline", "Clothing", "SPANDEX™", "Bag", "Knitted", "Screen", "Sandwich, and "Netting". Mesh fabric also can be anti-bacterial treated, highly permeable, tear resistant, and yarn dyed having sizes from about a thickness of 1 mm to about 150 mm, widths from about 15 cm to about 200 cm having length up to about 1000 cm and yarn count from about 25D to about 350D. The wadding and mesh fabric having weights from about 30 gsm to about 1200 gsm. Further, the anti-bacterial and other fibers can have fiber lengths from about 15 mm to about 85 mm, crimp rates from 5 to 50, bulkiness from about 75 to about 150 cm3/gram, defect flaw content from about 5 to 700 mg/100 g, and tenacity at break from about 2.0 to 6.0 cn/dtex.

Wadding materials can further include cushioning or dunnage packaging material such as foaming plastic, corrugated shapes, honeycomb paperboard, cushion film, etc., which provide some structural impact protection benefits. Wadding materials can further include thermoplastic polyurethane (TPU) having thermoplastic elastomers that combine the high elasticity and low compression rate of rubber with the process-ability of thermoplastic polymers. Additionally, rubber properties within a layer or layer(s) for the purpose of this invention include neoprene having good or excellent abrasion and tear resistance, with a durometer range (Shore A) of from 15 to 11, a tensile range pounds per square inch (P.S.I) of from 400-4000, and elongation maximum up to 700%, with good compression set, having a low temperature usage of 10° to −50° F.|−12° to −46° C. and a high temperature usage up to 250° F. and up to 121° C.

Further, the TPU having higher commercial benefit and stronger support ability than the homogeneous structures. Mesh fabric can also manifest honeycomb composite structures comprised in whole or in part of thermoplastic polyurethanes, polyester and polypropylene composites thus providing advantageous cushioning and strength properties. Honeycomb structures from one to six layers including thermoplastic polyurethane honeycomb cushion and grids structures such as non-woven can have vertical, horizontal, and width cell or air walls from about 0.5 mm to about 50 mm. Interior honeycomb structures can also be comprised of flat and expanding paper cells comprised of kraft paper and other paper in weights from about 20 lbs/3 msf to about 125 lbs/3 msf. The paper honeycomb can be contained within described materials within this application and also with kraft paper and other paper liner have single walls or multiple paper laminations combined with or without polyolefin plastic, or polyester layers from about 3 microns to about 50 microns thick. The various cells and material can be combined providing advantage such as from about 77.50-98.75% impact energy. Therefore, it becomes advantageous for protective wall(s) and layers in equine cushioning and protective wraps, such as the wraps 200 and pads 300 described herein. Further, closed porous honeycomb designs prevent the composite from deforming. It constitutes of surface liners and honeycomb air chambers, and therefore achieves excellent properties high elasticity and low compression strain rate. In an embodiment, a structural option includes inserting the honeycomb grid between PET/PP composite nonwovens, therefore having excellent cushioning and thermal-insulating properties. Also, improving cushioning through the means of incorporating a sandwich structure into nonwovens. The layer combination of PET/PP nonwoven and PP nonwoven affects tensile strength, tear strength, and thermal conductivity of resulting composite nonwovens, and hot baking decreases the above-mentioned properties of composite nonwovens. The resulting composite nonwoven before hot baking has excellent thermal insulation which has thermal conductivity of 0.03884-0.02213 W/(m K) via layer combinations.

Further, rational combination of TPU honeycomb cushion and grid into composite nonwovens effectively improves absorption coefficient at certain frequency and that at mid- and high-frequency. TPU honeycomb structure also increases the absorption ratio of impact energy to 92.88-96.59%. As mentioned above, the novel/cushioning TPU/PET/PP composite has a honeycomb structure that acts as the reinforcement for TPU/PET/PP composites and makes composites resisting against more impact energy. Therefore, TPU/PET/PP composites can directly be used as protective wall in equine products such as saddles, leg wrappings, and other covering when tensile strength and thermal characteristics are important, providing cushioning functionality.

In an embodiment, one or more layers of the wrap 200 or pad 300 can include three-dimensional air mesh fabrics which provide anti-static and tear resistant properties, among others and can be made with polyester, PVC, elastomerics, and polyolefin. The fabric cells can have circular, wrap-knitted, elongated, square, and hexagonal shapes. Some meshes can utilize tricot style knit types. Additionally, COOLMAX, NOMEX, polyamide, cooling effect yarn, and microfibers can be used within the structure. The fabric having a fixed or adjustable yard count from about 25 d to about 150 d and weights from about 50 gsm to about 600 gsm. Further, the 3D air mesh fabric can have a thickness from about 1 mm to about 150 mm, widths from about 15 cm to about 400 cm and having lengths up to about 1500 cm. Additionally, three-dimensional spacer fabrics can be employed in the cushioning structure. The spacer fabrics are normally, but not restricted to being manufacture on double needle bar wrap-knitting machines. Advantages provided to the equine wrapping and cushioning product(s) include, air permeability, high compression strength, durability, pressure distribution, and anti-bacterial. The layer can also be and option to foam and neoprene. Finally, thermos-physical qualities can be provided by three-dimensional air mesh fabrics.

In an embodiment, cellulose coatings can be used with one or more layers of the wrap or pad to assist the diffusion of water vapor molecules through the filling of the air gaps in the polyester leg wrapping fabrics by ultra-hydrophilic material that absorbs water vapor and transfers it to the hyperbolic coating layer on the wrapping fabric inner or outer layers. This can be done by coating ultra-hydrophobic layers with piles that are passing through the porous spaces between crossed yarns forming a fabric structure. By implementing this method of partial fine particle application in which the particles are to be firmly deposited at the misopores of the woven fabric structure, combined with a targeted binding of the particles to the woven fabric fibers, the coated layer will have a moisture attracting piles through the fabric pores that activate the mechanism of diffusion of the water vapor through the fibrous layers and rapidly pulled through to the outer layer. The micro-cellulose particles are ultra-hydrophilic material in which the moisture content can reach up to about 40% and the water absorption may reach up to 7000 (μl/g). Furthermore, they have high specific surface. This mechanism will force the transfer of moisture away from the skin to the outside of the fabric. The coating applied to outer surface enables the water to spread quickly where it can evaporate. The moisture vapor transport occurs by 'molecular wicking', and the water molecules are first adsorbed to the surface of the hydrophilic material then they move to the next molecule along. This process continues throughout the thickness of the hydrophilic material. Covering both sides of the fabric by ultra-hydrophobic material increases the diffusion of the water vapor through the fibrous layers, absorption, and transmission and desorption of water vapor by the outer coating layer.

Various techniques have been emphasized to develop better moisture management such as combining Polyester with different natural fiber types, microfiber, Bi-component fiber, especially different cross-section, plasma treatment and applying surface finish [22-40]. A material such as cellulose that is produced by both plants and bacteria on a totally sustainable basis assumes great significance for future materials.

Figure 15:
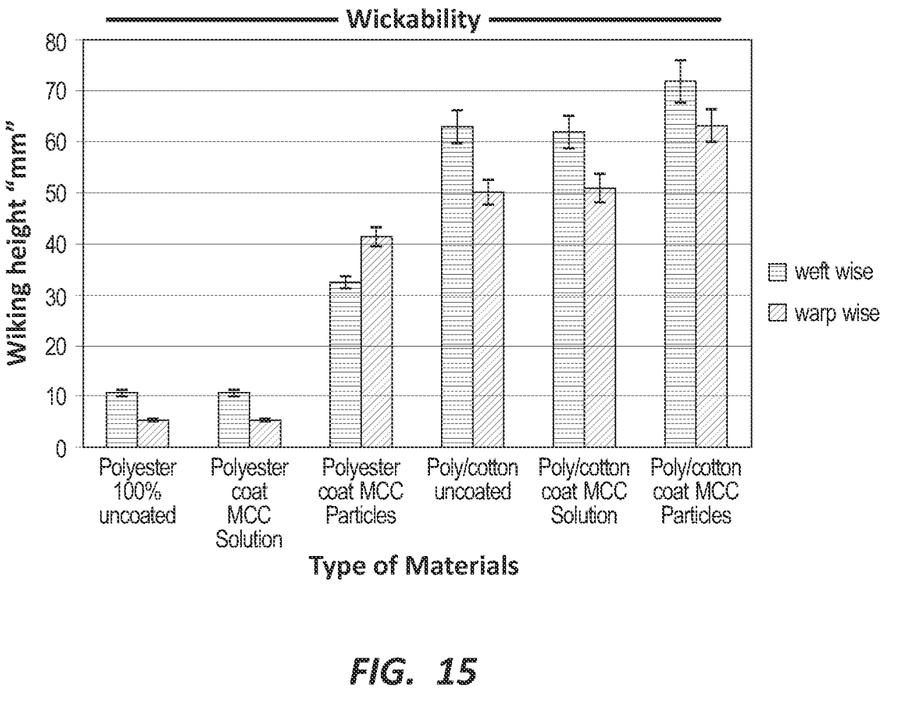
FIG. 15 is a chart showing Wickability, wicking height ("mm") of various types of materials, in accordance with an embodiment of the disclosure.

In an embodiment, microcrystalline cellulose (MCC) particle(s) applied from about 5% to 15% and in thicknesses from 5 to 25 microns having finish ratios from about 15% to 70% can be coated on to performance fabrics, thus engineered horse limb wrappings can be comprised to keep the equine body dry during vigorous activities. Keeping the body dry, especially during cold weather, ensures that the horse limbs do not lose heat unnecessarily by having wet skin and therefore the interaction of a coated fabric layers with moisture affects body comfort. Wicking is the spontaneous flow of liquid in a porous substance driven by capillarity force. The wicking is the most effective process to maintain a feel of comfort. In the case of wrapping materials with high wicking properties, moisture coming from the equine skin is spread throughout the fabric offering a dry feeling and the spreading of the liquid enables moisture to evaporate easily. The capillary pressure increases as the radius of the capillary reduces causing higher capillary rise of the liquid. The coatings will result in reduction of the pore size in the yarn and between weft and wrap. Depending on the distribution and size of the pores, the wicking height will be determined by Laplace equation as the radius of the capillary decreases, the pressure generated in the capillary will be higher, causing faster flow through the capillary. Hence the application of MMC to the surface of fabric layers contained within the equine wrapping interior or exterior will reduce the water vapor resistance and lessen the air permeability. There is difference in the wick-ability of the weft and wrap directions of the fabric. This may be due to the structure of fabric, hence, the number of picks/cm and ends/cm is not equal which leads to the different sizes of capillarity between the yarns, thus variation of the wicking height. Generally, the treatment of the fabric(s) with cellulosic coat will change the performance of wicking in the fabric; therefore, the coat will pull more water up increasing the fabric wick-ability. So, the mechanism of wicking in this case is rather complicated and will depend on the capillarity phenomena as well as the ability of finishing coat to absorb moisture, Wick-ability Table 8, is shown in FIG. 15.

The increase in the weight of coating layer may increase the wick-ability of the fabric in all circumstances; however, the percentage increase is more significant when using a coat ratio higher than 20% and when the coating material is prepared when coating a Polyester fabric. It can be also detected that the MCC particles have a pronounced influence in improving the wicking heights in both directions for polyester and polyester/Cotton fabrics. For the anti-wicking performance, it prevents the fabric from absorbing water through capillary action of the yarns as the coating material absorbs water by itself. In the case of anti-wicking fabric coating, the capillarity will be completely close and the coating material has non wick-able properties.

Exemplary materials that can be used in their entirety or as components of wrap and pad embodiments described herein, include mesh, air mesh, honeycomb mesh, cell mesh, and 3D air mesh fabrics comprised of one to six layers or dimensions, 1 to 3 mesh layers, yarn dyed, inter-woven fibers. The materials used in mesh structures include one or more of the shapes, composition, chemicals, polyesters, polymers, latex, natural fibers, synthetics, fillings, fiber fillings, yarns, single and multiple strands, slub-style, sandwich mesh, foams, or polyolefin described herein. The materials can be comprised of flat or die cut sheets, wrap-knitted, woven and crisp polyester mesh, sandwich layers, yarn died, including fiber content that can be found webbed or other formed patterns, included all types of holes or cell designs, e.g., eyelets. The mesh structure can be formed using lamination, weaving terry fabric, weft fabric, interlock style, knitting, tricot knitting, wrap knitting, or needle punching. Mesh characteristics found individually or in combination include anti-static, flame retardant, fluorescent, memory, shrink resistant, elastic, non-elastic, visco-elastic, tear-resistant, breathable, and waterproof. Surfaces of the mesh can be very soft, rough, smooth, or high friction. Further, the mesh can have color fastness to sweat of from about 1-10 per GB/T 3922-1995 and color fastness to rubbing dry and wet from about 1-10 per GB/T 3920-2008, and color fastness from Grade 2 to Grade 6, with yarn counts from about 25D to about 800D and mesh sizes in a range from mesh number #5 to about mesh number #250. Further, the mesh containing 3D spacer stretch mesh holes having from about 1,5001 M 2/S to about 10,0001 M 2/S ventilation and also being washable and fast drying. Finally, in some embodiments, the entire structure including all layers and individual layers may have widths to about 1500 mm, thicknesses to about 255 mm, and lengths to about 1850 mm.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A wrap for a lower limb of a horse, the wrap comprising:
    a first layer disposed adjacent a skin surface of the horse including a first material having high moisture wicking properties, and an ultra-hydrophobic coating including micro-cellulose particles applied thereto;
    a second layer disposed on an outer surface of the first layer including a second material having super-absorbent properties; and
    a third layer disposed on an outer surface of the second layer including a third material being a high tensile strength material, wherein:
    the first layer is configured to wick moisture to the second layer,
    the second layer is configured to expand, and
    the third layer is configured to restrict outward expansion of the second layer.

2. The wrap according to claim 1, wherein the third layer provides compressive support to the lower limb of the horse to mitigate swelling.

3. The wrap according to claim 1, wherein the third layer provides shock or impact absorbing properties.

4. The wrap according to claim 1, wherein the first material further includes a natural or synthetic, woven or non-woven, material selected from the group consisting of a polymeric composite, a co-polymer with olefins, an ethylene/propylene copolymer, a linear low density polyethylene, a fiber material, a pleated natural fiber, a pleated synthetic fiber, a non-pleated natural fiber, a non-pleated synthetic fiber, a spun bound yarn, an elastic core spun yarn, a synthetic wool, a polyester, an S polyester, a polyester loop pile, a core spun fiber, a spun bound fiber, an elastic core spun yarn, a mono filament, a PET/PTT bi-component filament, and cotton.

5. The wrap according to claim 1, wherein the first material displays molecular wicking properties.

6. The wrap according to claim 1, wherein the second material is a quilted fiber that includes a hydrogel super absorbent polymer material.

7. The wrap according to claim 1, wherein the second material includes a tensioning material having a water absorbency of up to 40 times its weight and having up to 25 times its strength when wet.

8. The wrap according to claim 1, wherein the third material includes one of nylon, polypropylene, polyolefin, polyester, Dyneema®, polyvinylchloride, or Kevlar®.

9. The wrap according to claim 1, wherein the third material includes a breaking strength of between 2.2 kN to about 8.9 kN.

10. The wrap according to claim 1, wherein one of the first layer and the second layer includes a sweat control and absorbing material selected from the group consisting of dimethylsulfoxide, nitrofurazone ointment, petroleum jelly, glycerin, glycerol, epsom salts, or mineral oil.

11. A wrap for a lower limb of a horse, the wrap comprising:
a first layer disposed adjacent a skin surface of the horse including a first material having high moisture wicking properties and including a polyester material having a coating of micro-crystalline particles applied at a density of between 5% to 15%, and applied to a thickness of between 5 microns to 25 microns, having finish ratios of between 15% to 70%, to provide the polyester material with a wicking height of between 30-40 mm;
a second layer disposed on an outer surface of the first layer including a second material having super-absorbent properties; and
a third layer disposed on an outer surface of the second layer including a third material being a high tensile strength material, wherein:
the first layer is configured to wick moisture to the second layer,
the second layer is configured to expand, and
the third layer is configured to restrict outward expansion of the second layer.

12. The wrap according to claim 11, wherein the third layer provides compressive support to the lower limb of the horse to mitigate swelling, or provides shock or impact absorbing properties.

13. The wrap according to claim 11, wherein the second material is a quilted fiber that includes a hydrogel super absorbent polymer material.

14. The wrap according to claim 11, wherein the second material includes a tensioning material having a water absorbency of up to 40 times its weight and having up to 25 times its strength when wet.

15. The wrap according to claim 11, wherein the third material includes one of nylon, polypropylene, polyolefin, polyester, Dyneema®, polyvinylchloride, or Kevlar®.

16. A wrap for a lower limb of a horse, the wrap comprising:
a first layer disposed adjacent a skin surface of the horse including a first material having high moisture wicking properties;
a second layer disposed on an outer surface of the first layer including a second material having super-absorbent properties, the second material including a high cross-link density super absorbent polymer with spherical micro-particles in a range of between 1 µm to 2 mm; and
a third layer disposed on an outer surface of the second layer including a third material being a high tensile strength material, wherein:
the first layer is configured to wick moisture to the second layer,
the second layer is configured to expand, and
the third layer is configured to restrict outward expansion of the second layer.

17. The wrap according to claim 16, wherein the first material displays molecular wicking properties.

18. The wrap according to claim 16, wherein the first material further includes a natural or synthetic, woven or non-woven, material selected from the group consisting of a polymeric composite, a co-polymer with olefins, an ethylene/propylene copolymer, a linear low density polyethylene, a fiber material, a pleated natural fiber, a pleated synthetic fiber, a non-pleated natural fiber, a non-pleated synthetic fiber, a spun bound yarn, an elastic core spun yarn, a synthetic wool, a polyester, an S polyester, a polyester loop pile, a core spun fiber, a spun bound fiber, an elastic core spun yarn, a mono filament, a PET/PTT bi-component filament, and cotton.

19. The wrap according to claim 16, wherein the third material includes a breaking strength of between 2.2 kN to about 8.9 kN, or includes one of nylon, polypropylene, polyolefin, polyester, Dyneema®, polyvinylchloride, or Kevlar®.

20. The wrap according to claim 16, wherein one of the first layer and the second layer includes a sweat control and absorbing material selected from the group consisting of dimethylsulfoxide, nitrofurazone ointment, petroleum jelly, glycerin, glycerol, epsom salts, or mineral oil.

* * * * *